(12) United States Patent
Caruel (10) Patent No.: US 8,919,700 B2
(45) Date of Patent: Dec. 30, 2014

(54) DE-ICING DEVICE, IN PARTICULAR FOR AN AIRCRAFT NACELLE

(75) Inventor: Pierre Caruel, Le Havre (FR)

(73) Assignee: Aircelle, Gonfreville L'Orcher (FR)

( * ) Notice: Subject to any disclaimer, the term of this patent is extended or adjusted under 35 U.S.C. 154(b) by 325 days.

(21) Appl. No.: 13/256,277

(22) PCT Filed: Feb. 19, 2010

(86) PCT No.: PCT/FR2010/050295
§ 371 (c)(1),
(2), (4) Date: Sep. 13, 2011

(87) PCT Pub. No.: WO2010/103212
PCT Pub. Date: Sep. 16, 2010

(65) Prior Publication Data
US 2012/0001026 A1 Jan. 5, 2012

(30) Foreign Application Priority Data
Mar. 13, 2009 (FR) ...................... 09 01182

(51) Int. Cl.
*B64D 15/12* (2006.01)
*H05B 3/34* (2006.01)
*B64D 33/02* (2006.01)

(52) U.S. Cl.
CPC *B64D 15/12* (2013.01); *H05B 3/34* (2013.01); *B64D 2033/0233* (2013.01); *H05B 2203/002* (2013.01); *H05B 2203/005* (2013.01)
USPC ................................. 244/134 D; 244/134 A (58) Field of Classification Search
CPC ........... B64D 15/12; B64D 2033/0233; B64D 15/20; B64D 2700/62114
USPC ......................................... 244/134 D, 134 A
See application file for complete search history.

(56) References Cited

U.S. PATENT DOCUMENTS

| 4,690,353 | A | * | 9/1987 | Haslim et al. ............. 244/134 D |
| 5,143,325 | A | * | 9/1992 | Zieve et al. ............... 244/134 D |
| 5,152,480 | A | * | 10/1992 | Adams et al. ............. 244/134 D |
| 6,227,492 | B1 | * | 5/2001 | Schellhase et al. ....... 244/134 D |
| RE38,024 | E | * | 3/2003 | Adams et al. ............. 244/134 D |
| 7,124,983 | B2 | * | 10/2006 | Chow et al. ............... 244/134 D |

(Continued)

FOREIGN PATENT DOCUMENTS

| DE | 4221454 A1 | 3/1994 |
| EP | 1495963 A2 | 1/2005 |

(Continued)

OTHER PUBLICATIONS

International Search Report PCT/FR2010/050295; Dated Apr. 21, 2010.

*Primary Examiner* — Rob Swiatek
*Assistant Examiner* — George Andonyan
(74) *Attorney, Agent, or Firm* — Brinks Gilson & Lione (57) ABSTRACT

A de-icing device for an aircraft nacelle includes two electric bands, and each of them is made from one main conductor oriented along a length of the band. In particular, the two electric bands have rectilinear elements and bent elements and are located on a same plane. Moreover, the two electric bands include spirals formed by association of several bent elements. Contiguous bands are embedded together in pairs, and the embedded bands are powered by different power supplies.

10 Claims, 5 Drawing Sheets

(56) References Cited

U.S. PATENT DOCUMENTS

| | | | |
|---|---|---|---|
| 7,291,815 B2 * | 11/2007 | Hubert et al. | 219/535 |
| 7,780,117 B2 * | 8/2010 | Botura et al. | 244/134 D |
| 2008/0152494 A1 * | 6/2008 | Froman | 416/95 |
| 2008/0179448 A1 * | 7/2008 | Layland et al. | 244/1 N |
| 2009/0095842 A1 * | 4/2009 | Gaertner et al. | 244/134 D |
| 2011/0120076 A1 * | 5/2011 | Vauchel | 60/39.093 |

FOREIGN PATENT DOCUMENTS

| | | |
|---|---|---|
| EP | 1953085 A1 | 8/2008 |
| FR | 2898868 A1 * | 9/2007 |
| WO | 2006108125 A2 | 10/2006 |

* cited by examiner

DE-ICING DEVICE, IN PARTICULAR FOR AN AIRCRAFT NACELLE

TECHNICAL FIELD

The present invention relates to a de-icing device for an air intake lip of an aircraft nacelle.

BACKGROUND

An aircraft turbojet engine nacelle generally has a structure comprising an air intake upstream of the turbojet engine, a middle section intended to surround a fan of the turbojet engine, a downstream section housing thrust reverser means and intended to surround the gas generator of the turbojet engine, and generally ends with a jet nozzle whereof the outlet is situated downstream of the turbojet engine.

The air intake of an aircraft nacelle comprises, on the one hand, an air intake lip adapted to allow optimal collection towards the turbojet engine of the air needed to supply the fan and compressors inside the turbojet engine and, on the other hand, a downstream structure on which the lip is fastened and intended to suitably channel the air towards the vanes of the fan. The assembly is attached upstream of a case of the fan belonging to the upstream section of the nacelle.

The formation of ice on the leading edges of an aircraft wing or on the air intake lips of the turbojet engines poses a number of problems, including: the addition of weight, imbalances between the port and starboard parts and, in the specific case of turbojet engine air intakes, the formation of blocks of ice of a nature to penetrate the turbojet engine and cause considerable damage, or to impact the airframe of the aircraft such as the engine nacelle stub, the wing, the tail group or the fuselage. In particular, depending on the temperature and humidity conditions, ice can form on the nacelle at the outer surface of the air intake lip. The presence of ice or frost alters the aerodynamic properties of the air intake and disrupts the conveyance of the air towards the fan. Bits of ice may detach from the air intake lip and collide with components of the turbojet engine such as the vanes of the fan, or the aircraft airframe.

The performance of the turbojet engine being related to the quantity and quality of the air collection done by the air intake, the air intake lip should be de-iced when ice or frost forms thereon. To that end, a number of de-icing or anti-icing systems have been developed in the aeronautics field. As a reminder, de-icing comprises evacuating the ice already formed, and anti-icing comprises preventing any ice from forming.

Anti-icing is necessary in particular in the case of turbojet engines comprising parts made from composite materials, such as the fan vanes: in such a case, it is necessary to eliminate any risk of ice arriving in the engine, the composite materials risking substantial damage in case of impact.

In the rest of this description, the term "de-icing" is used indifferently to designate de-icing or anti-icing.

Among the de-icing systems of the prior art, electric systems are known. An array of electric resistances is powered using a current created by electrical power supply members of the aircraft. These resistances are generally arranged in the skin of the leading edge or the air intake lip. These electric systems are very exposed to impacts of all kinds and in the case of perforating damage, they become problematic, if not impossible, to repair.

It is also known from the art, in particular from patent EP 1 495 963, to apply a heating resistor on an outer wall of the air intake lip. The heating resistor is subject to many impacts that can cause premature wear thereof, or even a malfunction thereof.

Such a malfunction of the heating resistor can cause ice or frost to build up on the air intake lip and therefore a decrease in the turbojet engine's performance.

Furthermore, the de-icing systems of the state of the art can be made up of conductors arranged in bands powered by different power supplies to limit breakdown problems due to a power shut-off. However, although part of the device is still powered in the event of a periodic power failure, blocks of ice appear on the entire length of the non-powered bands.

Such blocks of ice are large and can cause substantial damage when they are removed from the wall.

This is even more true in that the risks of tearing off are frequent since as the ice is deposited, the zone becomes thermally isolated from the outside air flow by ice accumulation and the temperature of the wall of the lip increases through the heat conduction effect resulting from the adjacent zone that is still powered. The interest of minimizing the size of these accumulations is therefore understood.

BRIEF SUMMARY

The present invention aims to offset all or part of the drawbacks previously mentioned.

According to a first aspect, this aim of the invention is achieved using a de-icing device, in particular for an aircraft nacelle, comprising at least two electric bands each made from at least one main conductor oriented substantially along the length of said band, characterized in that said bands comprise rectilinear elements and bent elements, in that said bands comprise spirals formed by the association of several bent elements, and in that the contiguous bands are embedded together at least in pairs.

Such an arrangement makes it possible to limit the surface of the non-heated zones between two bands supplied with electricity when a band does not work after an electrical power failure or a malfunction of a band after an impact.

In a solution with non-embedded contiguous bands, the ice aggregates formed in the event of power breakdown of a band, or too much damage to a band for it to be able to operate, are distributed in length over a significant distance taking into account the uniformity of the temperatures in the longitudinal direction of the bands. This temperature uniformity causes a simultaneous ejection of the entire aggregate that may cause significant damage in the structure of the apparatus during flight.

In the case of the present invention described above, in case of breakdown or malfunction of a band, the embedded band configuration makes it possible to vary the distance between the de-iced zones and the non-iced zones so that the melting of the ice is never uniform along the band. Hereafter, the device according to the present invention described above makes it possible to greatly reduce the size of the aggregates.

The term "conductor" within the meaning of the present invention designates electrical wires comprising an electrically conductive material, with a resistivity chosen as a function of the size of the de-icing device, its compactness, and the power to be dissipated to perform the de-icing function.

According to other optional features of the de-icing device according to the present invention:
- said bent elements are bent by a substantially 90° angle;
- at least one band comprises at least two main conductors: it is thus possible to connect at least two main conductors to each other in a band;

preferably, said band is provided with transverse conductors positioned periodically, said transverse conductors being able to redistribute the electrical current between at least two main conductors: the use of transverse conductors is particularly advantageous because it makes it possible to prevent a periodic breakdown in the device. Thus, when a group of main conductors, connected to each other periodically by transverse conductors, is damaged so that it can no longer conduct the current downstream of the breakdown, the two transverse conductors that frame the damaged zone pick up the relay and ensure the continuity, so that the entire band remains completely powered downstream of the breakdown; such a serial-parallel association, formed between different conductors, guarantees the electrical continuity in the band despite the rupture of one or several conductors of the band;

still more preferably, the transverse conductors are able to redistribute the electric current between all of the main conductors of a same band: an economical and simple-to-make configuration comprises connecting the transverse conductors to all of the main conductors to form an array of conductors connected in series-parallel;

preferably advantageously, the transverse conductors of the spirals are suitable for redistributing the electric currents between all of the main conductors of a same spiral: such a configuration makes it possible to ensure the electric continuity in a spiral as close as possible to a zone damaged by an impact causing one or more wires in the spiral to break;

still more preferably, the transverse conductors are positioned following at least one of the orientations chosen from amongst an orientation normal to the direction of the main conductors and an orientation oblique to the direction of the main conductors: such a configuration makes it possible to have main conductors with resistance homogeneity over all of their sections, which is further explained in the rest of the description;

said bands are supported by a surface having acoustic piercing patterns, and in that said conductors bypass said piercing patterns;

said embedded bands are powered by different power supplies: the term "different power supplies" (or "different power supply") within the meaning of the present application means several power supply sources (or another power supply source), but it is also possible to define several phases in the case of a multi-phase power supply, such as a three-phase power supply; in the event of a malfunction by one or more power supply sources powering a set of bands connected in parallel and embedded, the sizes of the ice aggregates is limited given that the non-heated zones are not homogenous around bands that are still working after the breakdown;

preferably, the bands are at least embedded by groups of three and the two end bands of said at least three embedded contiguous bands are made from at least two main conductors, and said end bands are positioned so that at least half of their main conductors are outside a zone capable of undergoing impacts, in particular from hail;

more preferably, it is powered by a three-phase power supply so that three contiguous bands are embedded and each powered by one of the three phases: such an arrangement is easy to produce and makes it possible only to use a single power supply, in this case a three-phase power supply, procuring an effect equivalent to that comprising connecting the contiguous bands over three different power supplies; this results in space savings and decreased weight;

still more preferably, said three bands are positioned in a star configuration.

According to a second aspect, the invention relates to an aircraft air intake lip incorporating a device as previously described.

BRIEF DESCRIPTION OF THE DRAWINGS

Other features and advantages of the invention will appear in light of the following description provided in reference to the appended figures, in which.

DETAILED DESCRIPTION

Within the meaning of the invention, the term "rectilinear element" designates a linear strip of a band that comprises all of the main conductors.

Within the meaning of the invention, the term "bent element" means a strip with a bend comprising part of the main conductors of a band. Associating several bent elements makes it possible to form spiral patterns.

Figure 1:
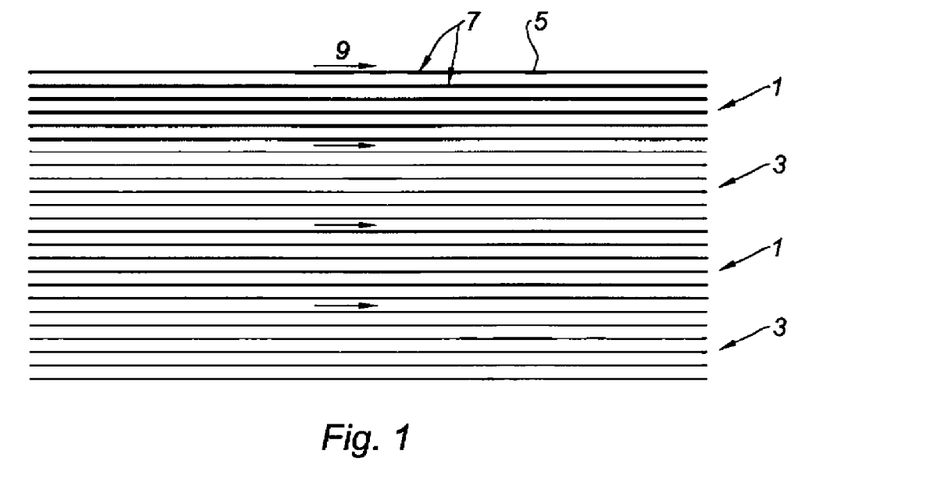
FIG. 1 shows a detailed view of a de-icing system with two power supplies of the state of the art.

FIG. 1 shows a de-icing system with two power supplies of the state of the art incorporating a first series of bands 1, respectively powered by a first power supply (not shown), and a second series of bands 3, respectively powered by a second power supply. Each band 5 is formed from a series of parallel main conductors 7 passed through by a current 9 shown by arrows, and distributed along the surface to be de-iced.

Figure 2:
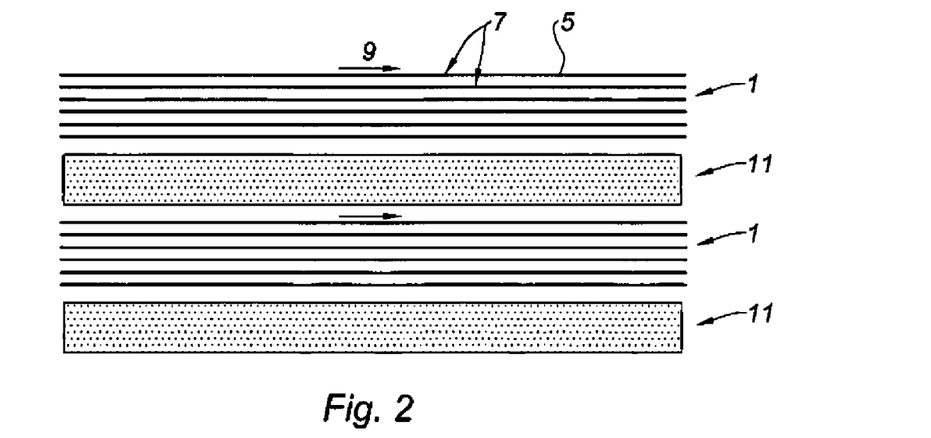
FIG. 2 shows a detailed view of a de-icing system with two power supplies of the state of the art with a power supply defect in one of the two power supplies.

FIG. 2 shows the same de-icing system of the state of the art, but in which one of the power supplies has been damaged or no longer works after a breakdown. Ice aggregates 11 form on the non-deiced surfaces and occupy the entire non-powered length of the bands 5. The uniformity of the temperatures along the bands 5 causes the ice aggregates 11 to be pulled off simultaneously over the entire length of the band 5, as a result of which large blocks of ice are detached, which can cause substantial damage.

Figure 3:
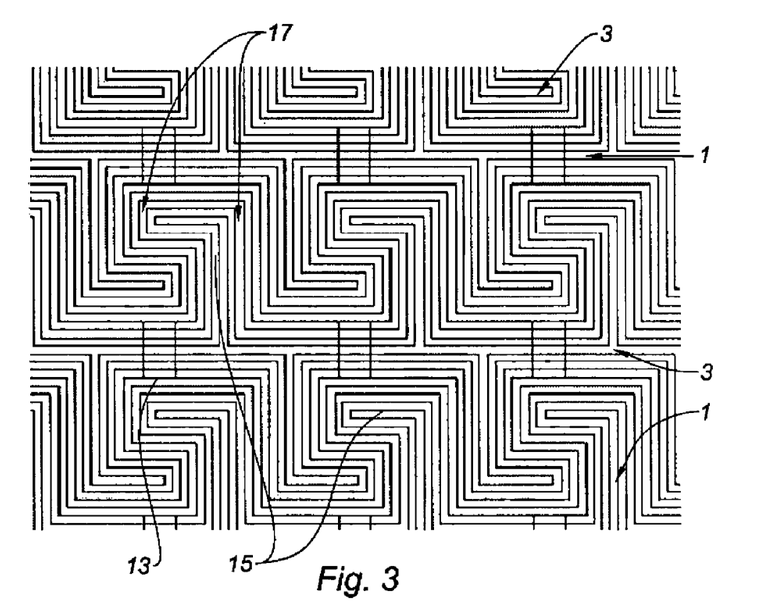
FIG. 3 shows a detailed view of a device with two power supplies according to the invention.

FIG. 3 shows an embodiment of the device according to the invention, comprising first and second series of bands 1 and 3, each series being powered by a different power supply. The series 1 and 3 contain rectilinear elements 13 and spirals 15. The spirals 15 are formed, for example, by combining elements 17 bent at 90°. The level of embedding of the bands 5 is not limited. It may be significant so as to increase the length of the bands 5 by surface unit, so as to increase their resistance and thereby allow the use of less resistive materials, or to increase the supply voltage of the grid and thereby reduce the size of the cables needed for the connection between the lip and the power supplies.

Figure 4:
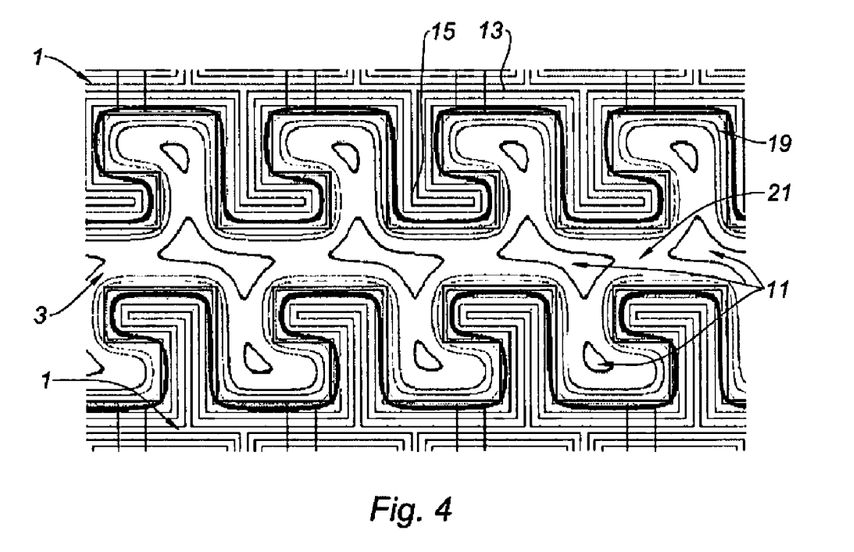
FIG. 4 shows a detailed view of a device with two power supplies according to the invention, with one of the series of bands having a power supply defect.

FIG. 4 shows the same embodiment according to the invention for which the power supply of the series of bands 3 no longer works after a breakdown. It is easy to conceive that a relatively violent impact can locally produce the same effect, and interrupt the circulation of current 9 in a band 1 of the series 3. The morphology of the ice aggregates 11 illustrated in FIG. 4 corresponds to that of small piles of ice due to the configuration of the isotherms 19, and given that the non-heated zone 21 following the power failure is not linear and is very localized.

Figure 5:
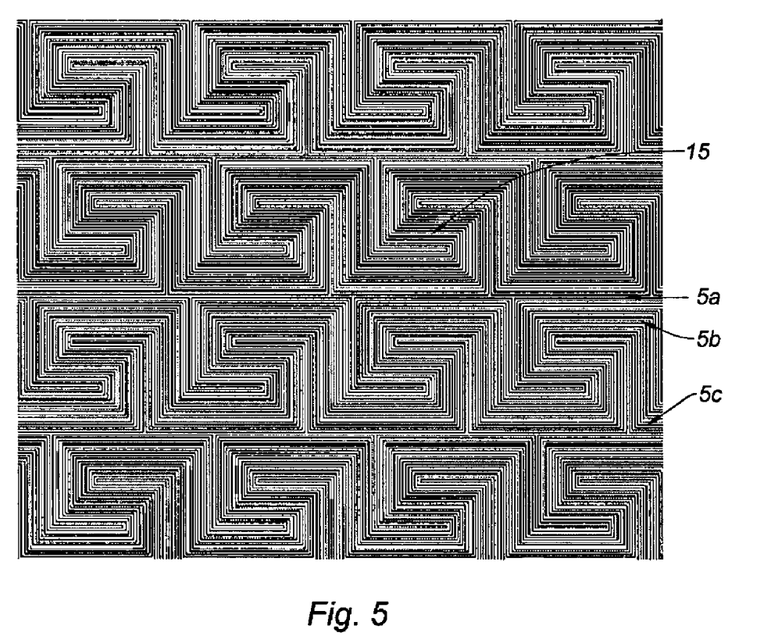
FIG. 5 shows a detailed view of a device powered by a three-phase electric grid according to the invention.
Figure 6:
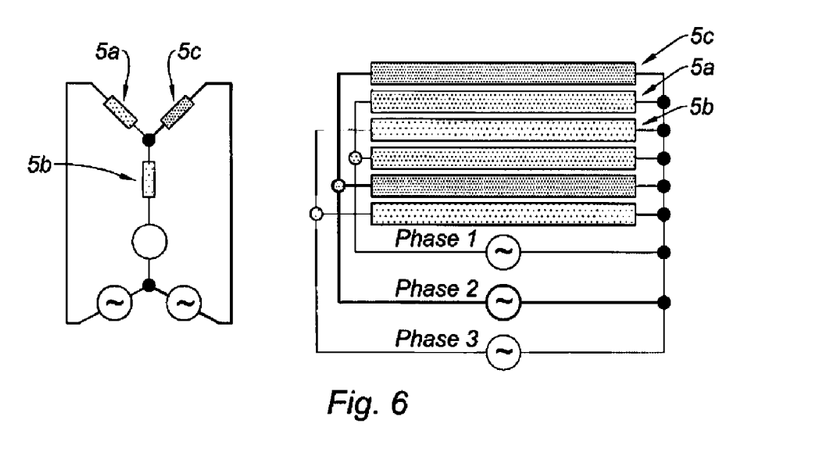
FIG. 6 shows a diagrammatic view of the arrangement of the bands powered by a three-phase system.

In the case of a deicing system connected to a three-phase network, a device is made with three power supplies (one per phase) in which each phase powers a series of bands 5. FIG. 5 shows an embodiment, particularly advantageous during the use of a three-phase power supply, where three bands 5a, 5b, 5c each powered by one of the three phases are embedded in a same spiral 15. In the case of the three-phase power supply, where the power supplies are not in phase, the bands 5 can preferably be positioned in a star configuration (see FIG. 6).

It may be advantageous to position such de-icing systems with three embedded bands 5a, 5b, 5c so that at least part, preferably half, of the main conductors 7 of the two end bands 5a and 5c is outside the area likely to undergo impacts, such as impacts from hailstones. The zones impacted by the hail are in particular situated in the part of the air intake lip of an aircraft nacelle furthest upstream. Thus in the case of multiple impacts causing damage over all of the main conductors 7 passing through the impacted zones, the two end bands 5a and 5c only being partially damaged perform the de-icing function on the impacted zone. Such an arrangement on, and around, the zone likely to be impacted can be generalized to a set of more than three embedded bands 5 whereof the two end bands guarantee a configuration of the isotherms 19 that minimizes the size of the ice aggregates. Of course, such an arrangement works optimally when the embedded bands are provided with transverse conductors 23, as is further explained in the rest of the description.

Figure 7:
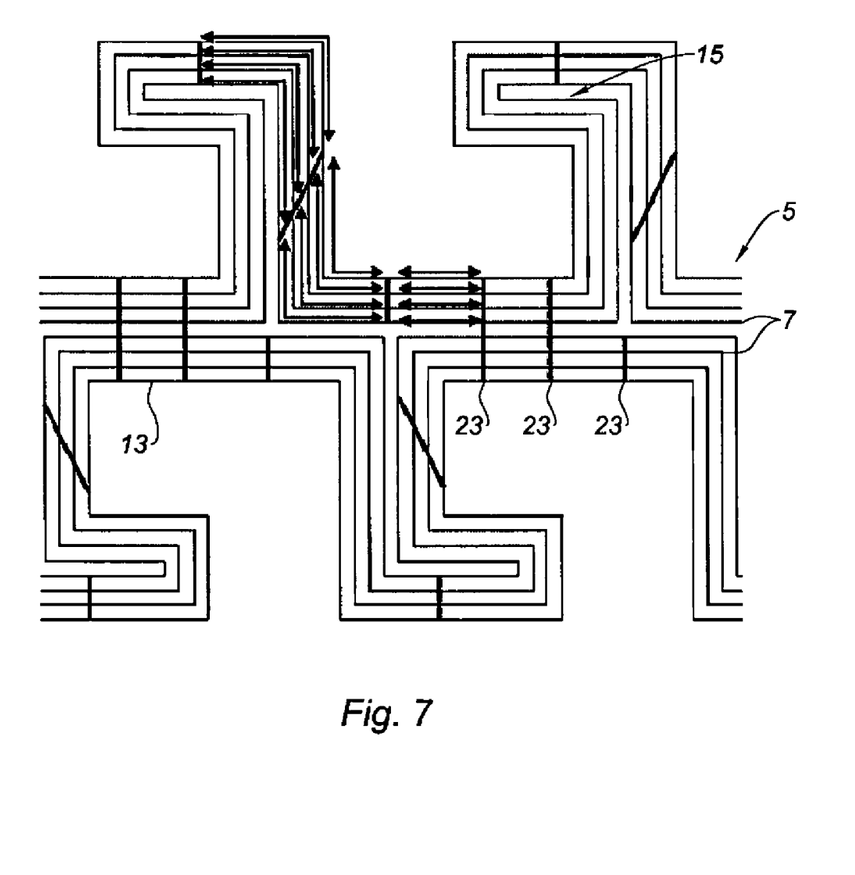
FIG. 7 shows a detailed view of a band of a device according to the invention with transverse conductors 23.

It is possible to provide for the use of a device with embedded bands 5 as previously seen, with bands 5 that also comprise transverse conductors 23 positioned so as to pass through a series of main conductors 7. Such bands 5 comprise a series of main conductors 7 periodically connected to each other by transverse conductors 23, so as to produce a series-parallel association and allow the electric continuity in the band 5 despite the break of one or more conductors of the band 5. In the case of devices with embedded bands 5 having several power supplies, such as the devices according to the invention described above, the transverse conductors 23 are preferably positioned: for the rectilinear element 13, so that they orthogonally intersect all of the main conductors 7 of a same band 5; for the spirals 15, so that they orthogonally and obliquely intersect all of the main conductors 7 of a same spiral (see FIG. 7). Such an arrangement makes it possible to guarantee that between two transverse conductors 23, the length (shown in FIG. 7 by double arrows) of the main conductors 7 is the same, as is therefore their resistance. This is so that the potential difference is zero so as not to send current 9 into the transverse conductors 23 in normal operation, but only in case of damage to one or more main conductors 7.

Figure 8:
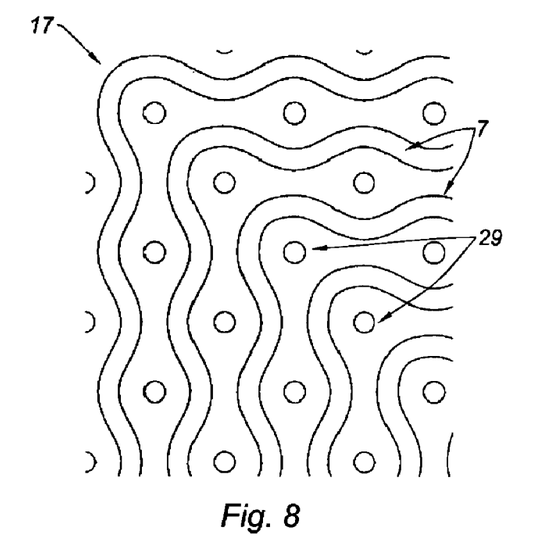
FIG. 8 shows a detailed view of a bent element of a device according to the invention supported by a structure containing piercing patterns.
Figure 9:
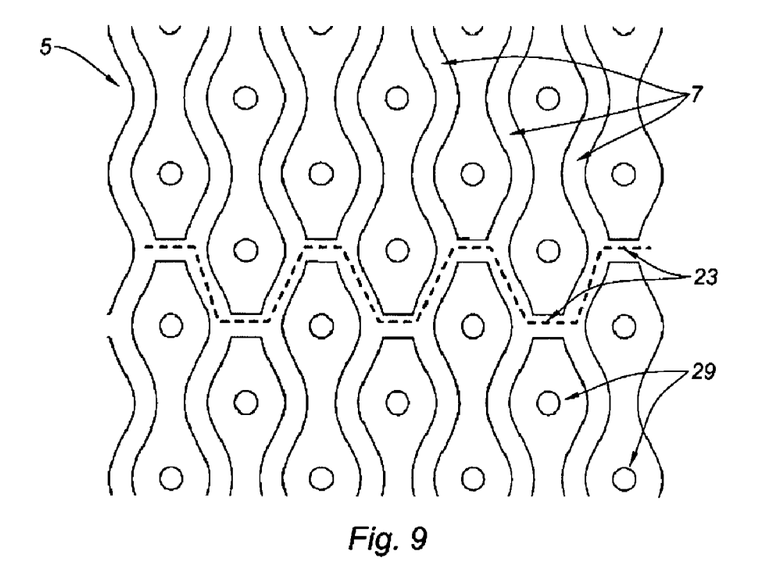
FIG. 9 shows a detailed view of a band of a device according to the invention supported by a structure containing piercing patterns.

FIG. 8 illustrates the configuration of the conductors in a band 5 of a device according to the invention, where main conductors 7 of the bent elements 17 of the band 5 bypass acoustic piercing patterns 29 in the structure of the surface to be de-iced. FIG. 9 illustrates the configuration of the conductors in a band 5 of a device according to the invention, where the main 7 and transverse 23 conductors bypass the acoustic piercing patterns 29 in the structure of the surface to be de-iced.

Of course, the present invention is not limited to the embodiments described and shown, provided simply as examples.

The invention claimed is:

1. A de-icing device for an aircraft nacelle, comprising:
   at least two electric bands each made from at least one main conductor oriented substantially along a length of said band,
   wherein said at least two electric bands comprise rectilinear elements and bent elements, wherein said at least two electric bands located on a plane each comprise spirals formed by association of several bent elements, and said at least two electric bands are at least embedded by groups of three and two end bands of at least three embedded contiguous bands are made from at least two main conductors, and wherein said end bands are positioned so that at least half of their main conductors are outside a zone capable of undergoing impacts,
   wherein contiguous said at least two electric bands are embedded together at least in pairs, and each of said at least two electric bands embedded in pairs is powered by an independent power source,
   wherein when one of the independent power sources fails, a configuration of the associated electric band results in a non-heated zone that is non-linear such that a shape of ice aggregates formed in the non-heated zone is non-linear and the ice aggregates are isolated from each other.

2. The de-icing device according to claim 1, wherein said bent elements are bent by a substantially 90 degree angle.

3. The de-icing device according to claim 1, wherein at least one band comprises at least two main conductors.

4. The de-icing device according to claim 1, wherein said at least two electric bands are supported by a surface having acoustic piercing patterns, and wherein said conductors bypass said piercing patterns.

5. The de-icing device according to claim 1, wherein the de-icing device is powered by a three-phase power supply so that three contiguous bands are embedded and each powered by one of the three phases.

6. An aircraft air intake lip incorporating the de-icing device according to claim 1.

7. The de-icing device according to claim 3, wherein said at least one band is provided with transverse conductors positioned periodically, said transverse conductors being able to redistribute an electrical current between at least two main conductors.

8. The de-icing device according to claim 7, wherein the transverse conductors are able to redistribute the electric current between all of the main conductors of a same band.

9. The de-icing device according to claim 7, wherein the transverse conductors of the spirals are suitable for redistributing the electric currents between all of the main conductors of a same spiral.

10. The de-icing device according to claim 7, wherein the transverse conductors are positioned following at least one of an orientation normal to a direction of the main conductors and an orientation oblique to the direction of the main conductors.

* * * * *